United States Patent
Joensuu

(10) Patent No.: US 7,970,395 B2
(45) Date of Patent: Jun. 28, 2011

(54) METHOD AND APPARATUS FOR IMPROVING CALL QUALITY

(75) Inventor: Erkki Joensuu, Siuntio (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 701 days.

(21) Appl. No.: 12/091,965

(22) PCT Filed: Nov. 21, 2005

(86) PCT No.: PCT/EP2005/056111
§ 371 (c)(1),
(2), (4) Date: Apr. 29, 2008

(87) PCT Pub. No.: WO2007/057052
PCT Pub. Date: May 24, 2007

(65) Prior Publication Data
US 2008/0261586 A1 Oct. 23, 2008

(51) Int. Cl.
*H04W 24/00* (2009.01)
(52) U.S. Cl. ..................................................... 455/424
(58) Field of Classification Search ............... 455/452.2, 455/414.2, 453, 560, 445, 67.1, 406, 423, 455/67.13, 424, 452.1, 456.5; 370/229, 352, 370/338, 238, 254, 252, 452.2, 389; 379/266, 379/134, 32.01, 140, 224, 112.06, 100.05, 379/137, 154, 98, 34, 112, 389, 133, 835, 379/113; 704/201, 200, 225
See application file for complete search history.

(56) References Cited

U.S. PATENT DOCUMENTS

| | | | | |
|---|---|---|---|---|
| 4,907,260 A * | 3/1990 | Prohs et al. | ................... | 379/224 |
| 5,867,565 A * | 2/1999 | Morikawa | ................ | 379/112.06 |
| 6,011,838 A * | 1/2000 | Cox | ........................ | 379/112.06 |
| 6,075,849 A * | 6/2000 | Lee et al. | ........................ | 379/140 |
| 6,078,647 A * | 6/2000 | D'Eletto | .................... | 379/32.01 |
| 7,890,089 B1 * | 2/2011 | Fujisaki | ..................... | 455/414.2 |
| 2002/0072333 A1 * | 6/2002 | Gnesda et al. | ............... | 455/67.1 |
| 2003/0202507 A1 * | 10/2003 | Nishida et al. | ............... | 370/352 |
| 2003/0227870 A1 * | 12/2003 | Wagner et al. | ................ | 370/229 |
| 2004/0024589 A1 * | 2/2004 | Kondo et al. | ................ | 704/201 |
| 2004/0095914 A1 * | 5/2004 | Katsube et al. | ............... | 370/338 |
| 2004/0243404 A1 * | 12/2004 | Cezanne et al. | ............. | 704/225 |
| 2006/0142018 A1 * | 6/2006 | Matz et al. | ................ | 455/452.2 |
| 2007/0160154 A1 * | 7/2007 | Sukkar | .......................... | 375/242 |
| 2007/0209065 A1 * | 9/2007 | Branam et al. | ..................... | 726/5 |
| 2007/0286082 A1 * | 12/2007 | Hikspoors et al. | ............ | 370/238 |

* cited by examiner

*Primary Examiner* — Melody Mehrpour
(74) *Attorney, Agent, or Firm* — Roger S. Burleigh

(57) ABSTRACT

A method of selectively improving the quality of calls carried by a communications network. The method comprises defining off-peak and peak call periods, and during off-peak periods, for each call carried by the network, analysing call data to determine whether or not a network based Voice Quality Enhancement function should be applied to the call and, if yes, applying the function to the call. A database is maintained containing subscriber and/or terminal identities together with respective Voice Quality Enhancement function requirements, said requirements being updated based upon determinations made during said off-peak periods. During peak periods, said network based Voice Quality Enhancement function is invoked on a per call basis in dependence upon the requirements contained in said database for the user(s) and/or terminal(s) participating in the calls.

12 Claims, 2 Drawing Sheets

METHOD AND APPARATUS FOR IMPROVING CALL QUALITY

FIELD OF THE INVENTION

The present invention relates to a method and apparatus for improving the quality of a call, for example a voice call, carried by a communications network.

BACKGROUND TO THE INVENTION

The quality of a call carried over a telecommunication network will be dependent upon a variety of factors. Take for example the case of a voice call carried over a telecommunications network. The voice quality, as perceived by a listener at an end user terminal, will be dependent upon both terminal properties and properties of the network. In the case of a call involving a wireless terminal, quality will also be dependent upon the qualities of the radio link(s).

Mobile terminal manufacturers strive to introduce into their terminals components and functionality to produce optimal call quality, so-called Voice Quality Enhancement (VQE) functions. These might include Mobile Crosstalk Control (echo cancellation) and Noise Reduction functions. However, VQE functions will inevitably impact on the cost of terminals with the result that low end terminals may provide poorer quality performance than high end terminals.

In an attempt to provide a more uniform quality of service to users, network operators can introduce into their network some of the VQE functions. In the case of a mobile network, this may be done at a Mobile Switching Centre (MSC) or at a Media Gateway, or integrated into network echo cancellers on TDM trunks. Such network based VQE functions may operate on coded or uncoded data. Of course, a VQE function may not be required for certain terminals (indeed most terminals), but the processing load placed on a network element to determine, on a per-call basis, when a VQE function is required can still be very high. When such a per-call VQE feature is implemented, the processing capacity of a node may drop by 30 to 40%.

It has been proposed to invoke network based VQE functions based upon user subscriptions or subscriber terminal types. However, the former is problematic because users may change their terminals at fairly regular intervals. The latter is problematic because it may not be possible for the network to maintain an up-to-date database of terminal types and respective VQE functions, and because it may not be possible for a terminal to signal its type to the network.

SUMMARY OF THE INVENTION

The inventor of the present invention has recognised that it is possible to take advantage of spare capacity during off-peak periods to apply network based VQE functions to all calls carried by the network. Using a database built-up during the off-peak periods, it is possible to apply, during peak periods, VQE functions to only those calls that will benefit from the functions without having to determine this on a per-call basis from call data.

According to a first aspect of the present invention there is provided a method of selectively improving the quality of calls carried by a communications network, the method comprising:
  defining off-peak and peak call periods;
  during off-peak periods, for each call carried by the network, analysing call data to determine whether or not a network based Voice Quality Enhancement function should be applied to the call and, if yes, applying the function to the call;
  maintaining a database containing subscriber and/or terminal identities together with respective Voice Quality Enhancement function requirements, and updating said requirements based upon determinations made during said off-peak periods;
  during peak periods, invoking said network based Voice Quality Enhancement function on a per call basis in dependence upon the requirements contained in said database for the user(s) and/or terminal(s) participating in the calls.

A Voice Quality Enhancement function may be applied to one or both directions of a call. In the latter case, the Voice Quality Enhancement function is applied essentially independently in each direction.

Examples of network based Voice Quality Enhancement functions which might be applied to a call are Mobile Crosstalk Control and Noise Reduction. The above method is typically applied separately for each function type, with the requirements being stored in a common database.

It will be understood that the method may be applied to calls of a particular type, for example voice calls. However, the method may alternatively be applied to other call types including, for example, video calls.

Typically, said step of analysing call data comprises analysing user data, for example speech or video data. In addition however, the analysis may be carried out on call properties such as codec type.

Said step of invoking the network based Voice Quality Enhancement function may comprise accessing the database from a call control node, and signalling the requirement from the call control node to a second node at which the Voice Quality Enhancement function is implemented. In a particular embodiment of the invention, said call control node is a Mobile Switching Centre, and said second node is a Media Gateway.

The present invention has the significant advantage that the computationally expensive step of analysing call data to determine whether or not a Voice Quality Enhancement function should be applied to a call, is carried out only during off-peak periods. During peak periods, this determination is made merely by looking up a database. A further advantage of the invention is that new algorithms can be introduced to determine whether or not a Voice Quality Enhancement function should be used for a given subscriber or terminal at any time. The database will "learn" from the new (improved) analyses.

According to a second aspect of the present invention there is provided a network based node for use in a communication network, the node comprising:
  means for analysing call data for each call carried by the network during off-peak periods to determine whether or not a network based Voice Quality Enhancement function should be applied to the call and, if yes, for applying the function to the call;
  memory means for storing a database containing subscriber and/or terminal identities together with respective Voice Quality Enhancement function requirements, or means for accessing such a database;
  means for updating said requirements of the database based upon determinations made during said off-peak periods; and
  means for invoking said network based Voice Quality Enhancement function during peak periods on a per call basis in dependence upon the requirements contained in said database for the user(s) and/or terminal(s) participating in the calls.

According to one embodiment of the above second aspect of the invention, the network based node is a Mobile Switching Centre (MSC) of a cellular telecommunications network. In other embodiments of the invention, the node may be a media gateway or dedicated Voice Quality Enhancement placed in the call path.

In the case where the network based node is a Mobile Switching Centre, said means for invoking the network based Voice Quality Enhancement function may comprise means for signalling the Voice Quality Enhancement function to a Media Gateway of the network.

DETAILED DESCRIPTION OF CERTAIN EMBODIMENTS

The present invention will now be illustrated using the example of a Voice Quality Enhancement (VQE) function designed to provide Mobile Crosstalk Control for voice calls carried across a wireless telecommunications network such as a GSM or 3G network. Crosstalk arises in voce data originating at a mobile terminal. For a mobile to fixed line call, crosstalk will arise in only one direction, whereas for a mobile to mobile call crosstalk will arise in both directions. Any suitable algorithm for detecting and removing crosstalk may be used.

Figure 1:
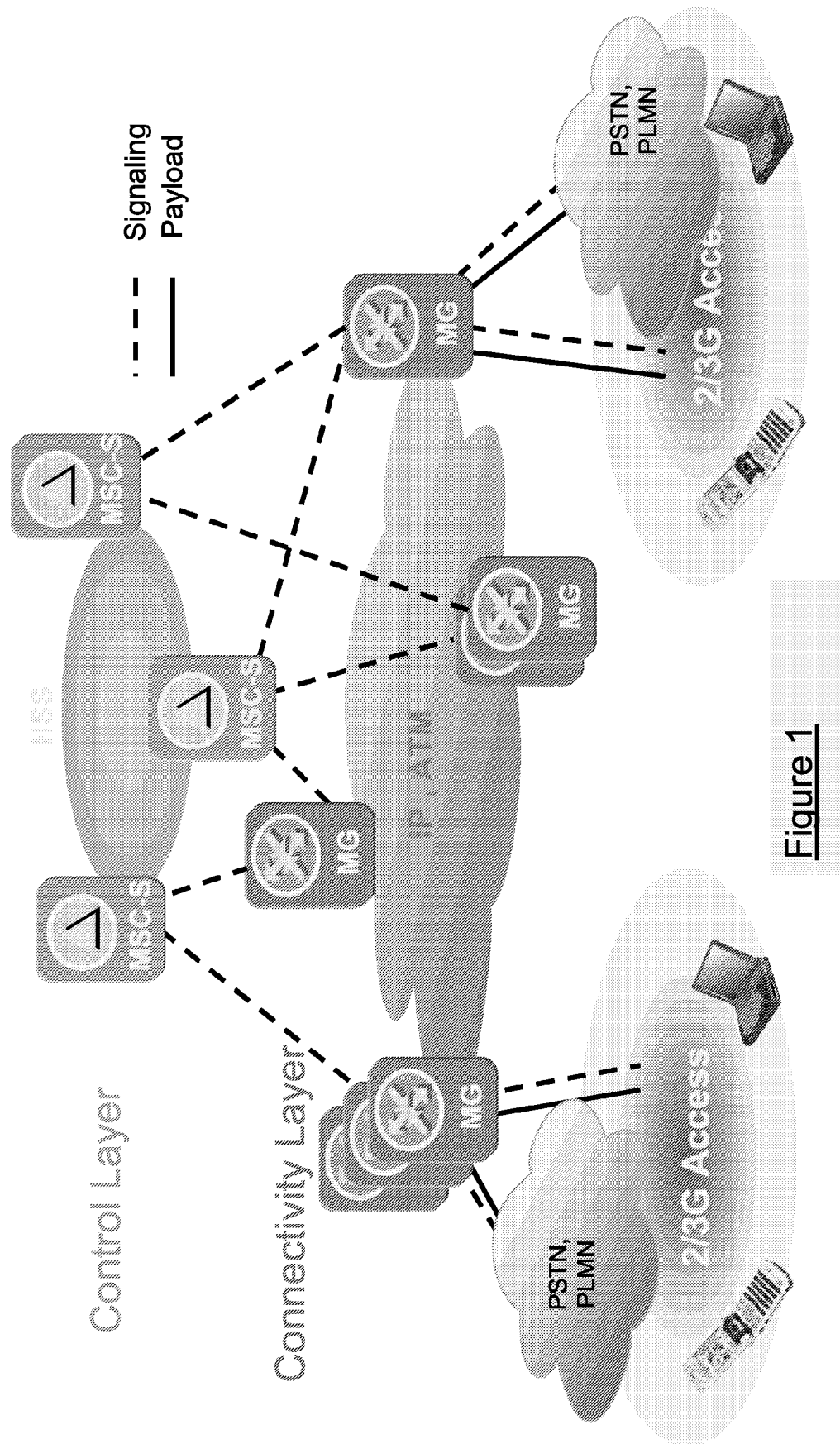
FIG. 1 illustrates schematically a wireless telecommunications network comprising a Mobile Switching Centre.

FIG. 1 illustrates a wireless telecommunications network comprising a Mobile Switching Centre (MSC) server of a GSM or 3G network. Subscriber terminals are registered with MSC servers depending upon their locations. An MSC server is arranged to set up voice calls via Media Gateways (MGw's) which provide interfaces between the mobile network and a trunk network or IP backbone. By way of example, it is assumed here that the VQE function implementing the MCC is implemented at a Media Gateway (MGw). The Media Gateway Controller (MGC) is functionality integrated into the MSC, with the MGC communicating with the MGw using a suitable Gateway Control Protocol (GCP), e.g. H.248.

A new database is associated with the Home Location Register (HLR) present in the home network. For each mobile subscriber, identified by a unique International Mobile Subscriber Identity (IMSI), or for each mobile terminal identified by a unique International Mobile Equipment Identity (IMEI), the database contains one or more VQE function flags. Each flag identifies whether or not the corresponding network based VQE function is enabled for that subscriber or terminal. In addition, each flag may be associated with one or more parameters which specific to the corresponding VQE function. When a new subscriber or terminal is added to the database, the flag may be set by default to off. During call set-up for a mobile subscriber or terminal registered with the MSC server, the VQE invocation flags are requested from the HLR by the MSC server. In the case of a roaming subscriber, the flags and any associated parameters may be transferred from the HLR to a Visitor Location Register (VLR) at subscriber registration together with the subscriber data, and are requested by the serving MSC server from the VLR at call set-up. Alternatively, the visited network may build its own database at the VLR, or indeed not apply VQE at all.

At the MGw, calls are handled in dependence upon the time of day at which they are initiated. More particularly, peak and off-peak times are defined, e.g. nights and weekends may be defined as off-peak, whilst other times are defined as peak. In an alternative approach, peak and off-peak periods can be defined dynamically by continuously or periodically measuring network load. Some form of hysteresis may be applied to prevent switching between peak and off-peak prematurely.

Off-peak calls are handled as follows. A call is set up over the network by the MSC server instructing a Media Gateway (MGw) to provision the necessary resources. As part of this instruction, the MSC server sends a VQE function invocation flag, together with any associated parameters, determined from the database in dependence upon the identity of the originating subscriber or terminal. This may be sent using the H.248 protocol with a new "package" (e.g. to the ADD or MOD command). However, the MGw disregards this flag and, as voice data begins to flow through the MGw, the MGw applies the crosstalk detection algorithm to determine whether the MCC function should be applied to the outgoing call direction (from the subscriber or terminal for whom the flag was obtained to the peer terminal). If the answer is yes, MCC is applied to the voice data in this direction. If the answer is no, MCC is not applied. In both cases, the MGw informs the MSC server of the result including the relevant VQE type (in this case MCC) and any specific parameters, together with the identity (IMSI or IMEI) of the subscriber or terminal from which the data being analysed originated. This may again be achieved using the H.248 protocol enhanced with a new "package". Notification may happen immediately after the MGw makes the determination, or at a later stage, e.g. at call termination. In any case, the MSC server compares the result against the flag set for that subscriber/terminal, and updates the flag to the new setting if the need for the MCC function has changed.

In the case of a mobile to fixed line call, MCC will be applied only to the outgoing direction for the mobile side. In the case of a mobile to mobile call, MCC will be applied in both directions. If the same MSC server is responsible for both mobiles, the server will provide the flags to the MGw for both mobile sides. If different MSC servers are responsible for the two mobile sides, each MSC server will provide the invocation flag for the terminal for which it is responsible (to the same or different MGw's).

In the event that the database becomes full, it is possible to overwrite old data with new data, even if this means that no data exists for a given subscriber or terminal. This is not a long term problem as, when as a new entry for the deleted subscriber or terminal will be created the next time that the subscriber or terminal makes or receives a call during an off-peak period.

During peak periods, when it is desirable to reduce the overall processing load on the MGw, the crosstalk detection algorithm is not applied to calls at the MGw. Rather, at each call initiation, the MGw applies MCC only if this requirement is indicated to it by the MSC in the call set-up instruction. In some cases, where the IMSI or IMEI is not available to the MSC or where the database does not contain an entry for a particular IMSI or IMEI, the MSC will make a decision on whether or not to invoke a particular VQE function based on some default behaviour. In some cases, the MSC may be able to specifically request a "missing" IMSI or IMEI from a terminal.

Figure 2:
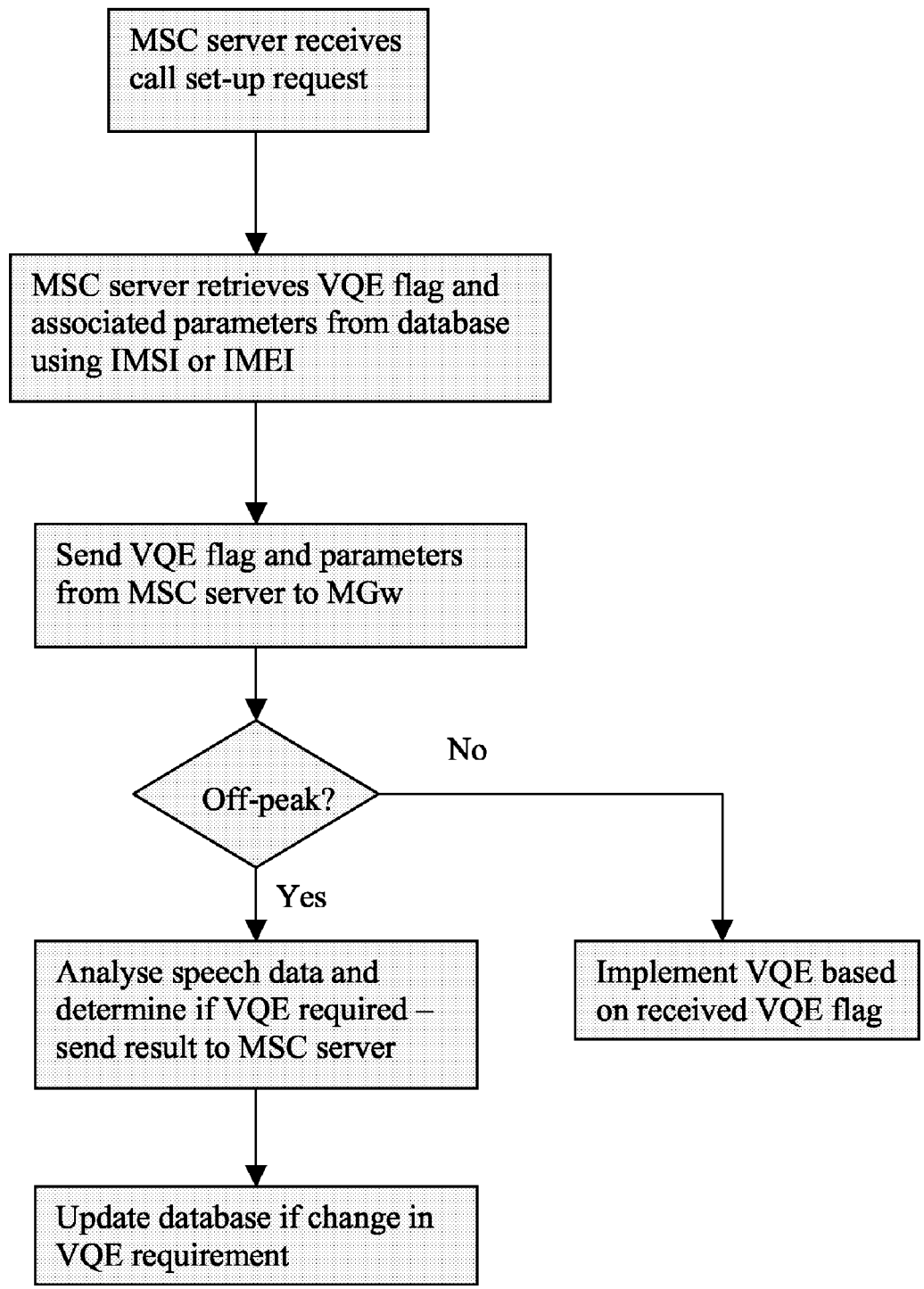
FIG. 2 is a flow diagram illustrating a process for improving voice quality for a voice call carried over the network of FIG. 1.

This process for handling voice calls is illustrated by the flow chart of FIG. 2.

This method effectively constructs a database of terminal capabilities either directly or based upon a presumption that a user is using a particular terminal. In the latter case, if a user changes terminal at some time, at worst this will only result in a reduced quality for calls made during one or a short number of peak periods until such time as the user makes a first call during an off-peak period and the crosstalk detection algorithm is applied to the voice data.

For some VQE functions, it is perhaps not appropriate to switch the status of the flag for that function based upon an analysis of one call made during an off-peak period. Consider for example a Background Noise Reduction (NR) function. Background noise may not arise for every call made by a subscriber, but there may be a pattern to its appearance. A modification to the process described above therefore is to use as a basis for setting the flag, a ratio of the number of calls requiring NR to the total number of calls made by a subscriber or terminal. Each time the MGw informs the MSC server that NR has been invoked (during off-peak periods), a counter is incremented in the database, the ratio calculated, and the flag set accordingly. When a call set-up request is received at the MSC server during a peak period, NR is invoked according to the current state of the flag in the database.

It will be appreciated by the person of skill in the art that various modifications may be made to the above described embodiment without departing from the scope of the present invention. For example, rather than providing the VQE function requirement database at the HLR, this may be provided at the VLR, or at a stand alone node within the network. In an alternative embodiment of the invention, the database is provided at or linked to the MGw. In this case, the MSC provides the IMSI or IMEI to the MGw at call invocation. In the case of a PDC network (a Japanese cellular standard), the database may be provided at the Gateway Location Register (GLR).

The invention claimed is:

1. A method of selectively improving the quality of calls carried by a communications network, the method comprising the steps of:
   defining off-peak and peak call periods;
   during off-peak periods, for each call carried by the network, analysing call data to determine whether or not a network based Voice Quality Enhancement function should be applied to the call and, if yes, applying the function to the call;
   maintaining a database containing subscriber and/or terminal identities together with respective Voice Quality Enhancement function requirements, and updating said requirements based upon determinations made during said off-peak periods; and,
   during peak periods, invoking said network based Voice Quality Enhancement function on a per call basis in dependence upon the requirements contained in said database for the user(s) and/or terminal(s) participating in the calls.

2. The method according to claim 1, wherein said Voice Quality Enhancement function is one of Mobile Crosstalk Control and Noise Reduction.

3. The method according to claim 1, wherein said calls are voice calls.

4. The method according to claim 1, wherein said step of analysing call data comprises analysing the information content of the call.

5. The method according to claim 1, wherein said step of invoking the network based Voice Quality Enhancement function comprises accessing the database from a call control node, and signaling the requirement from the call control node to a second node at which the Voice Quality Enhancement function is implemented.

6. The method according to claim 5, wherein said call control node is a Mobile Switching Centre and said second node is a Media Gateway.

7. The method according to claim 1, wherein the step of updating said requirements based upon determinations made during said off-peak periods comprises changing a requirement in a database if it is determined during an off-peak period that the requirement for a Voice Quality Enhancement function for a call is different to the requirement set in the database.

8. The method according to claim 1, wherein the step of updating said requirements based upon determinations made during said off-peak periods comprises collecting statistical data on the number of calls made by a given terminal or subscriber during off-peak periods for which a Voice Quality Enhancement function is invoked, and changing a requirement in the database only the ratio of such calls to the total number of calls during these periods is above or below a predefined ratio.

9. The method according to claim 1, wherein said step of maintaining a database comprises storing in the database, for each subscriber or terminal, one or more features for a Voice Quality Enhancement function, and applying the corresponding features when the Voice Quality Enhancement function is invoked.

10. A network based node adapted to selectively improve the quality of calls in a communication network, the node comprising:
    means for analysing call data for each call carried by the network during off-peak periods to determine whether or not a network based Voice Quality Enhancement function should be applied to the call and, if yes, for applying the function to the call;
    memory means for storing a database containing subscriber and/or terminal identities together with respective Voice Quality Enhancement function requirements, or means for accessing such a database;
    means for updating said requirements of the database based upon determinations made during said off-peak periods; and,
    means for invoking said network based Voice Quality Enhancement function during peak periods on a per call basis in dependence upon the requirements contained in said database for the user(s) and/or terminal(s) participating in the calls.

11. The node according to claim 10, said network based node being a Mobile Switching Centre (MSC) of a cellular telecommunications network, a Media Gateway, or dedicated Voice Quality Enhancement placed in the call path.

12. The node according to claim 10, wherein said network based node is a Mobile Switching Centre and said means for invoking the network based Voice Quality Enhancement function comprise means for signaling the Voice Quality Enhancement function to a Media Gateway of the network.

* * * * *